United States Patent [19]

Lake

[11] Patent Number: 4,533,171

[45] Date of Patent: Aug. 6, 1985

[54] LIFT-ROOF TRAILER

[75] Inventor: W. H. Russell Lake, Lathrup Village, Mich.

[73] Assignee: Trail-R-Van Inc., Lathrup Village, Mich.

[21] Appl. No.: 474,963

[22] Filed: Mar. 14, 1983

[51] Int. Cl.³ ............................................... B60P 3/32
[52] U.S. Cl. ....................................... 296/173; 296/27
[58] Field of Search ................... 296/27, 26, 156, 164, 296/168, 172, 173

[56] References Cited

U.S. PATENT DOCUMENTS

| | | | |
|---|---|---|---|
| 2,131,110 | 9/1938 | Lynn | 296/173 |
| 2,168,661 | 8/1939 | Anderson | 296/173 |
| 2,582,635 | 1/1952 | Kipple | 296/173 |
| 3,050,331 | 8/1962 | Mansen | 296/27 |
| 3,582,131 | 6/1971 | Brown | 296/27 |
| 3,701,561 | 10/1972 | Friesen | 296/27 |
| 4,165,117 | 8/1979 | Kaiser | 296/27 |
| 4,167,284 | 4/1978 | Messina | 296/171 |
| 4,171,843 | 10/1979 | Steury | 296/27 |

Primary Examiner—Robert R. Song

[57] ABSTRACT

A multi-purpose closed trailer for use with motor vehicles, providing walk-in access with a low frontal area for energy-efficient highway operation.

A lightweight cover having a lockable, top-hinged rear door/window is matched with a trailer load bed, to which it is hingedly attached at the forward end. Suitable compression struts and attaching bracketry, latching means, sealing means and a lift handle are arranged in such a configuration relative to the cover and load bed as to provide:

(1) availability of locked security in a closed cover position,
(2) access to interior in a closed cover position,
(3) ease of opening of the cover from a single operator location,
(4) support of the cover in a raised, open position for purposes of walk-in access,
(5) accommodation of removable, fitted kitchen and convertible bed/seat units for camping use,
(6) accommodation of removable, flexible panels to provide full enclosure with a raised cover.

20 Claims, 18 Drawing Figures

LIFT-ROOF TRAILER

BACKGROUND OF THE INVENTION

This invention relates to closed trailers and specifically to an improved design for use with light motor vehicles, providing walk-in access and having a low profile for energy-efficient highway operation.

Various forms of closed trailer for use with light motor vehicles are available which employ a fixed, closed, lockable cover. These include travel trailers and covered trailers for cargo use. Beside being lockable, a fixed cover offers convenience in that it requires no special effort in order to gain access to cargo or to make ready for stationary use after travel, or conversely, to make ready for travel. However, a fixed rigid cover, if high enough to allow walk-in access, results in a large trailer frontal area and, consequently, relatively high aerodynamic drag when in motion, compared with that of a trailer presenting a lower roofline, other things being equal. This results in the requirement of greater towing power and higher energy usage.

As the energy crisis has progressed in the U.S.A., resulting in the need for more fuel-efficient transportation, the automobile has been reduced in both size and power, so that the average motor vehicle is no longer capable of towing a trailer of as great a size and weight as could be towed in the past. To provide acceptable towing vehicle power requirements, rigid lockable covers have been designed which may be lowered for travel and raised to allow walk-in access for loading or other stationary use. These include trailers with mechanisms for raising and lowering a rigid roof section, including roofs which slide vertically over the side walls of the lower body section and trailers having walls which pivot inward from a lower mounting. Such systems are generally applied to sleeping travel trailers. The main disadvantages of such prior art designs are that they require use of parts which are often unique to a particular application and employ relatively complex mechanisms. Opening or closing of such designs generally requires the operator to move to more than one location around the trailer to unlock, unlatch and wind, pump or lift to raise the top. Such designs are therefore relatively costly and/or lack convenience in use.

For smaller trailer applications, where locked closed security of the cargo area is required, rigid covers formed typically of fiberglass reinforced plastic or aluminum, used in conjunction with hinges and counterbalancing spring struts to allow ease of opening from an approximately horizontal position, are available. Such covers, however, are generally limited to light goods or camping gear use, and like drop-roof sleeper trailers, lack the convenience of accessibility when in the lowered for travel position.

SUMMARY OF THE INVENTION

Accordingly, a general object of my invention is to combine readily available low cost components in a new way so as to create a closed, lockable hardtop trailer for use with light motor vehicles, providing improvements over the prior art in energy efficiency and user convenience.

The improved design of closed trailer employs an appropriate design of trailer load bed matched to a commercially available pickup truck load bed cover having a closed forward end and a top-hinged rear door/window (as, for example, an aluminum cover manufactured for use with an 8 foot Jeep load bed by Leer Inc. of Elhart, Ind. Alternately, a cover may be employed which is based upon a commercially available pickup truck cover, but modified for aerodynamic improvement in the forward end. The cover is hingedly attached at its forward end to the forward end of the trailer load bed and a pair of commercially available compression struts (as, for example, gas compression struts manufactured by SUSPA Incorporated of Grand Rapids, Mich.) and a left and a right rearward latching means are used in conjunction with suitable mounting bracketry, fastener means and sealing means in such a configuration between the cover and the load bed as to utilize the structural properties of the cover to maximal advantage in creating a rigid, lift-roof, closed trailer which provides the following convenience and efficiency benefits:

Lockability in a closed cover condition, using only the standard locking means provided for the rear top-hinged door/window;

Access to the interior in the closed cover position;

Ease of opening or closing of the cover from a single operator location;

Low aerodynamic drag due to low frontal area with the cover in the closed position, providing reduced energy demands for towing, suitable for the lower power of smaller motor vehicles;

Walk-in access in a raised cover position;

See-through visibility to the rear, with use of a forward window, is provided to the driver of the towing vehicle as a result of the feasibility of matching the window heights of the trailer and the towing vehicle;

With use of removable bar struts a range of fixed cover positions may be provided between the fully closed and the fully raised positions;

By means of appropriate dimensioning and location of the compression struts a removable camper kit may be fittedly installed;

With addition of suitable flexible panelling full enclosure may be provided in a raised cover position.

Further objects and advantages will become readily apparent to those skilled in the art to which the invention pertains upon reference to the following detailed description.

DESCRIPTION OF THE DRAWINGS

The description refers to the accompanying drawings, in which reference characters refer to like parts throughout the several views and in which.

DESCRIPTION OF THE PREFERRED EMBODIMENTS

Figure 1:
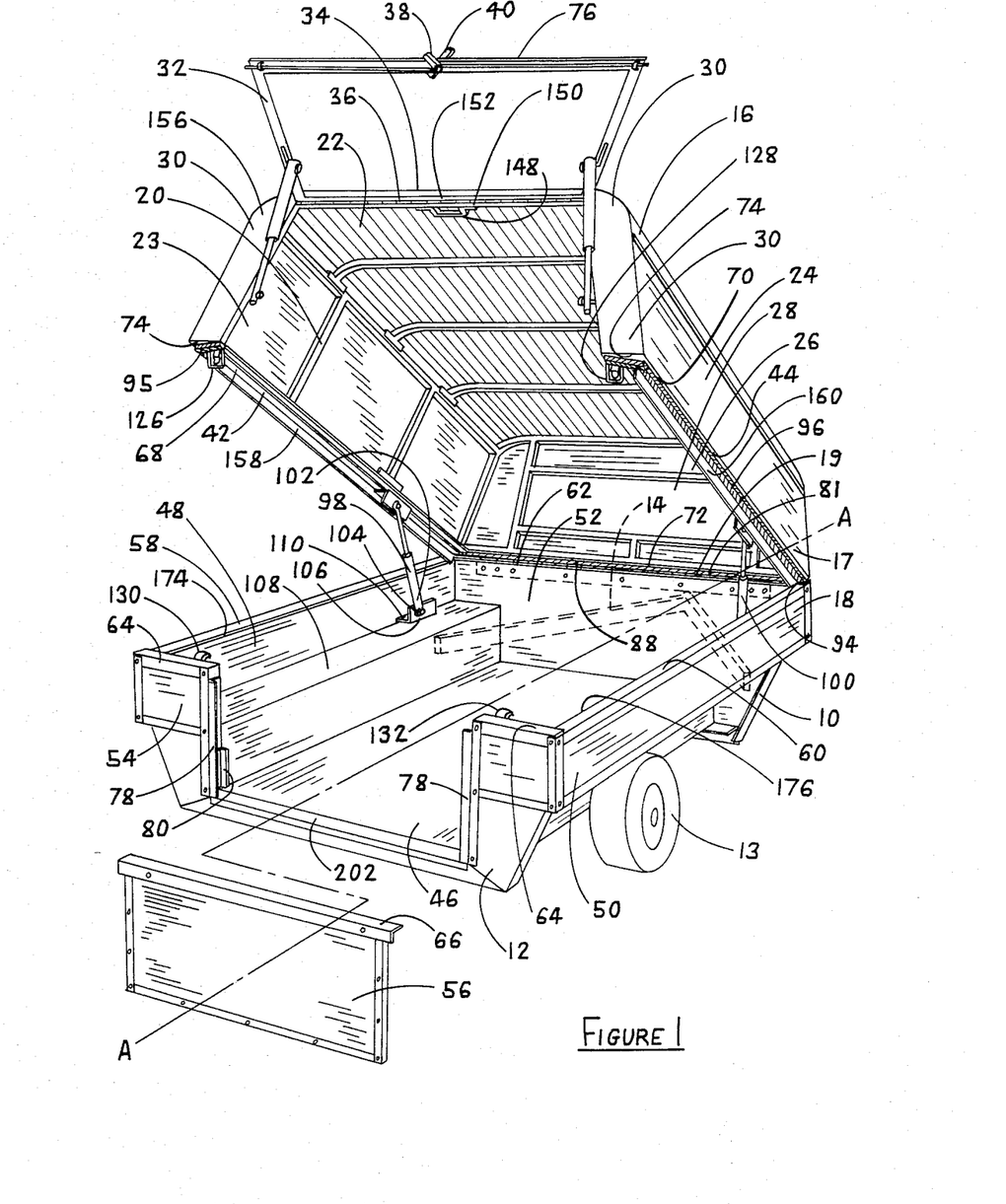
FIG. 1 is a perspective view of a preferred lift-roof closed trailer, as seen in an open position from the rear.

Referring to FIG. 1; the lift-roof trailer 10 is seen to include a trailer load bed 12 mounted on suitable wheels 13 and incorporating a suitable coupling means 14 for the purpose of attachment to a tow vehicle. A cover 16, of a type generally applied to use with an open load bed pickup truck, is pivotally attached at its forward end 17 to the forward end 18 of the load bed 12 by hinge or pivot means 19. A preferred design of said cover 16 incorporates a framework 20 supporting a roof 22, a left wall 23, a right wall 24, a forward wall 26 generally incorporating a front window 28, and rear wall 30 generally incorporating a rear door/window 32; said rear door/window 32 being hingedly attached to the rear edge 34 of said roof 22 by hinge means 36 and having an inside latch means 38 operated by an exterior locking handle means 40. The left and right walls 23,24 at their lower edges join horizontal skirts or flanges 42, 44, each extending forward from the rear wall 30 to the forward wall 26 and inward from said walls 23,24 a distance sufficient to provide an acceptable stiffening effect. The load bed 12 includes a floor 46, a left wall 48, a right wall 50 a forward wall 52 and a rear wall 54, said rear wall 54 including a removable tailgate 56, said walls 48,50,52,54 having upper edges or surfaces 58,60,62,64,66 in combination forming a full perimetral opposing interface with the lower edges or surfaces 68,70,72,74,76 of the cover 16. The load bed 12 also includes tailgate retainer means 78,80 which function to allow removal of the tailgate 56 only when the the rear door/window 32 is in an unlocked condition and/or the cover 16 is in a raised position.

Figure 2:
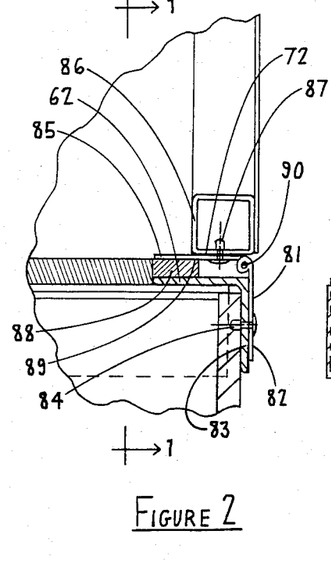
FIG. 2 is a fragmentary sectional view of a preferred forward hinged mounting of the cover to the forward end of the trailer load bed.
Figure 3:
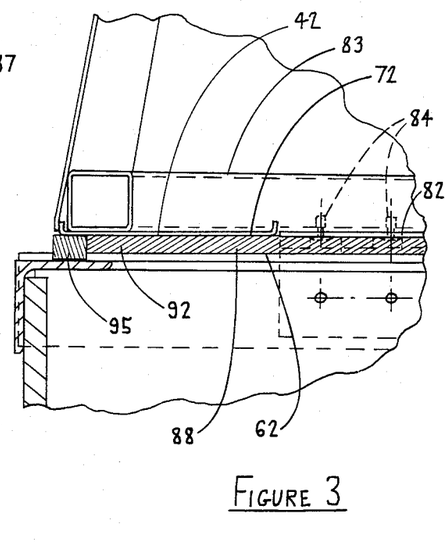
FIG. 3 is a fragmentary sectional view as seen along lines 1—1 of FIG. 3.

Referring to FIG. 1, FIG. 2 and FIG. 3; the hinge or pivot means 19 is in the form of a piano hinge 81 extending laterally across the forward wall upper edge 62 and having a first leaf 82 attached to the load bed upper forward lateral structural member 83 by suitable fastener means 84 and second leaf 85 attached to the cover frame lower forward lateral structural member 86 by suitable fastener means 87. Weather sealing means is provided by a flexible seal 88 adhesively attached at its upper surface 89 to said second leaf 85 at a location rearward of the hinge pin 90 and extending laterally across the cover forward wall lower surface 72, to mate at its outer ends 92,94 with longitudinal flexible seals 95,96 adhesively attached to the left and right horizontal skirts 42,44.

Figure 4:
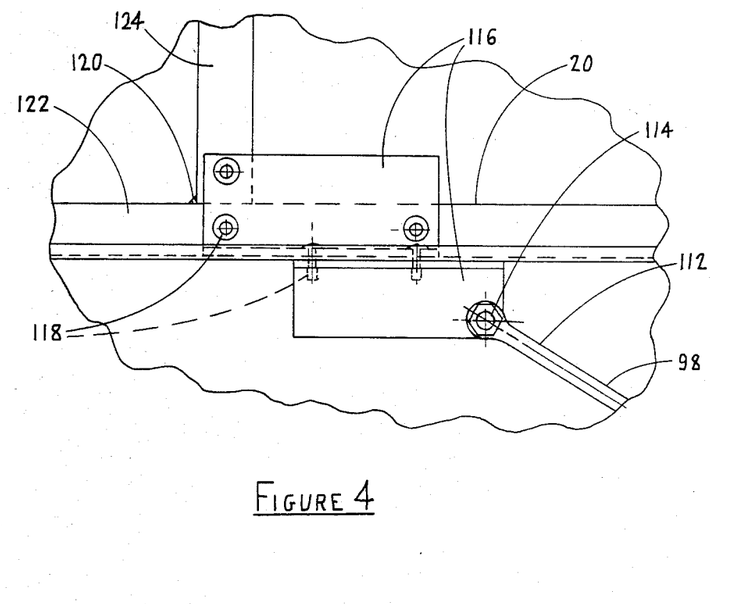
FIG. 4 is fragmentary side view of attaching and reinforcing bracketry between the left compression strut upper pivot and the cover frame.

Referring to FIG. 1; the cover 16 is partly or fully raised to and supported in an open position by means of compression struts 98,100. The left compression strut 98 is attached at its lower end 102 through pivot means 104 and an intermediate pivot support bracket 106 rigidly attached to the load bed structure 108 by suitable fastener means 110. Referring to FIG. 4; the left compression strut 98 is attached at its upper end 112 through pivot means 114 and intermediate bracketry 116 with fastener means 118, as necessary to provide local reinforcement of the framework 20 in proximity to the junction 120 between the cover frame left lower longitudinal structural member 122 and the cover frame vertically intersecting structural member 124 which is most suitably located, as determined by desired geometry for correct operation of said left compression strut 98. The right compression strut 100 is mounted between the cover 16 and the load bed 12 in a manner and with means forming a mirror image to the mounting heretofore described for the left compression strut 98 as seen about a vertical plane drawn through the load bed longitudinal axis A—A.

Figure 5:
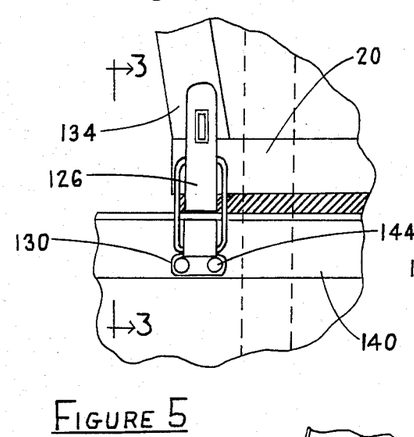
FIG. 5 is a fragmentary view looking rearward of a preferred left latching attachment between the cover frame and the trailer load bed showing also the location of a bar strut.
Figure 6:
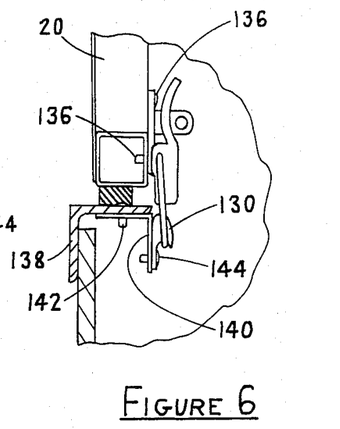
FIG. 6 is a fragmentary sectional view as seen along lines 3—3 of FIG. 5.

Referring to FIG. 1; to hold the cover 16 in a closed position relative to the load bed 12, when this condition is required, left and right latching means 126,128 are employed in conjunction with left and right latching means mating parts 130,132. Referring to FIG. 5 and FIG. 6; in a preferred design, the left latching means 126 is attached to the cover framework 20 in proximity to the member 134 with suitable fastener means 136 and is located so as to engage the left latching means mating part 130 which is attached to a load bed structural member 138 by means of a suitable mounting bracket 140 and suitable fastener means 142,144. The right latching means 128 and right latching means mating part 132 are attached in a manner and with means forming a mirror image about a vertical plane through a trailer longitudinal centerline to the configuration heretofore described for the left latching means 126.

Referring to FIG. 1; a handle 148 is attached inside the cover 16 to a framework structural member 150 in proximity to the rear door/window hinge means 36 in a central location 152. Use of said handle 148 for raising or closing the cover 16 ensures that the rearward end 156 of said cover 16 may be moved vertically by an operator using one hand with minimal torsional strain of said cover 16 which might result from application of unbalanced side-to-side lift or closing force.

Figure 7:
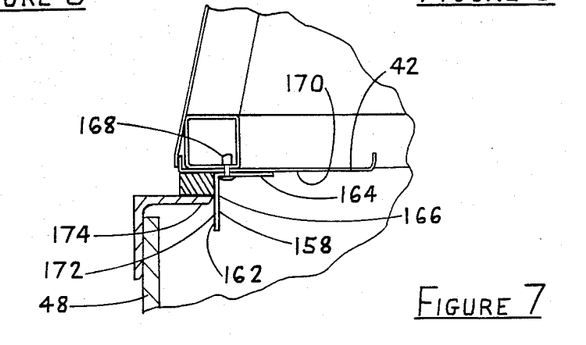
FIG. 7 is a fragmentary sectional view of a full length closing guide means and seal.

To guide the cover 16 to a desired central location relative to the load bed 12 and to provide alignment of the left and right latch drawlatch means 126,128 with mating parts 130, 132 as said cover 16 is lowered to a closed position, a left closing guide means 158 and a right closing guide means 160 are provided. Referring to FIG. 7; for a first alternate design, said left closing guide means 158 comprises a straight structural member 162 having a first wall 164 at right angles to a second wall 166 and being attached at said first wall 164 with suitable fastener means 168 to the lower surface 170 of the left horizontal skirt 42, with said second wall 166 presenting a surface 172 which serves to engage or bear against the upper inside finishing edge 174 of the load bed left wall 48. Referring again to FIG. 1; the right closing guide means 160 is of a form and is attached to the cover 16 in manner and with means similar to those pertaining to the left closing guide means 158, but so as to present a mirror image about a vertical plane through a trailer longitudinal centerline. The left and right closing guide means 158,160 are of such length that, in the raised or open cover position, fractional portions of their lengths will engage or lie between the trailer load bed left and right upper finishing edges 174, 176 in proximity to the cover hinge or pivot means 19, but in a closed cover condition the full lengths of the left and right closing guide means 158, 160 will engage or lie between said left and right upper finishing edges 174,176. The left and right full length closing guide means 158,160 serve also to provide location for the longitudinal seals 95,96.

Figure 8:
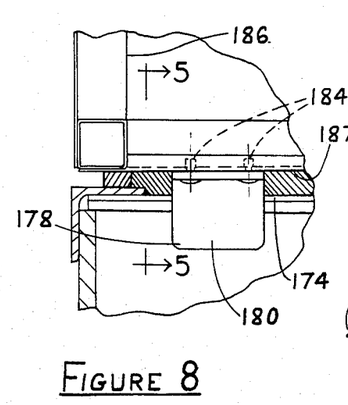
FIG. 8 is a fragmentary side view of an alternate closing guide means.
Figure 9:
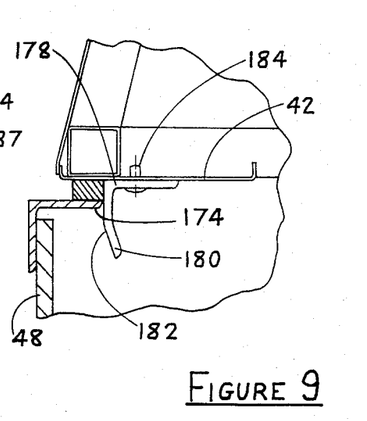
FIG. 9 is a fragmentary sectional view as seen along lines 5—5 of FIG. 8.
Figure 13:
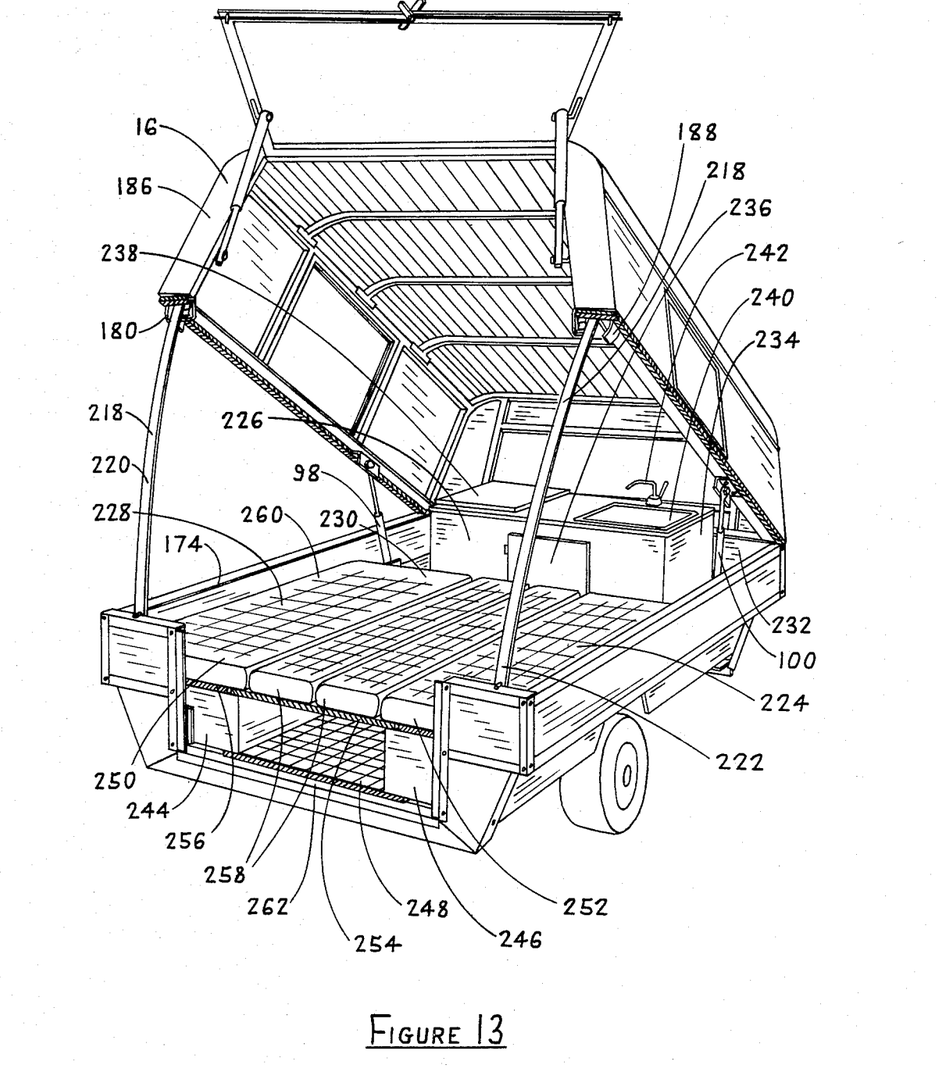
FIG. 13 is a perspective view of a lift-roof trailer showing a preferred camper kit installation.

Referring to FIG. 8, FIG. 9 and FIG. 13; in a second alternate design of closing guide means 178, a left short guide bracket 180, having an inclined face 182, is attached with suitable fastener means 184 toward the cover rearward end 186 against the lower surface 187 of the left horizontal skirt 42 and is positioned so as to cause said inclined face 182 to engage or slide against the left upper inside finishing edge 174 of the load bed left wall 48 in such a way that, in combination with a mirror image configuration of parts in a right side location 188, the cover 16 is caused to be guided to a central position relative to said load bed 12 as said cover 16 is lowered to a fully closed position.

Figure 10:
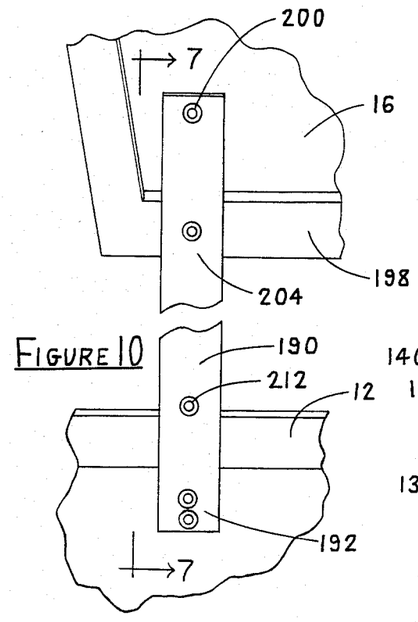
FIG. 10 is a fragmentary view looking rearward of a removable fixed length bar strut in an installed position between the load bed and cover.
Figure 11:
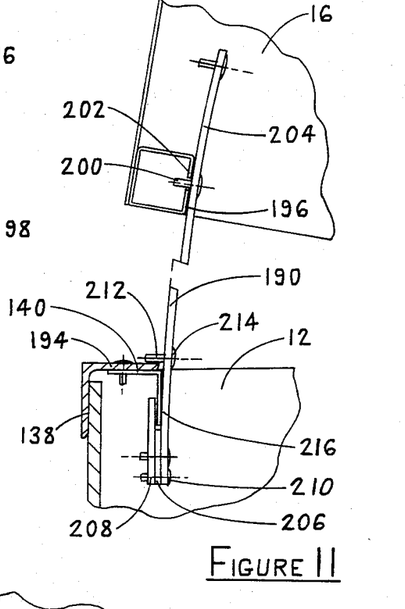
FIG. 11 is a fragmentary sectional view along lines 7—7 of FIG. 10.

Referring to FIG. 10 and FIG. 11; a preferred form of removable fixed length bar strut 190 is shown as installed between the load bed 12 and the cover 16 for the purpose of providing a fixed open position of said cover 16 relative to said load bed 12. The fixed length strut 190 is made from suitable material having a uniform leaf section so that, when installed for use, said fixed length strut is relatively flexible in a direction parallel to the longitudinal axis A—A of the trailer load bed 12 and relatively rigid in a direction which is perpendicular to said axis A—A. The fixed length strut 190 is designed at its lower end 192 to engage a fixed mounting 194, comprising load bed structural member 138 and bracket 140, in such a manner that the elasticity of said fixed length strut 190 causes it bear against the lower inside edge 196 of the cover structural framework 198. One or more pins or members 200, which may engage a suitable hole or mating part 202, are attached toward the upper end 204 of said fixed length strut 190 with such orientation as to allow engagement with said suitable hole or mating part 202 under fore/aft deflected movement of said fixed length strut 190. At the lower end 192 of the fixed length strut 190, a spacer 206 and retainer plate 208 are attached by suitable fastener means 210 and a lower load pin means 212 is suitably fastened at a location 214 such that, in the installed position, said fixed length strut 190 is held toward the forward face 216 of the fixed mounting 194 by said retainer plate 208, and is restricted from upward movement by said spacer 206 and from downward movement by said lower load pin means 212 bearing against said fixed mounting 194.

Figure 12:
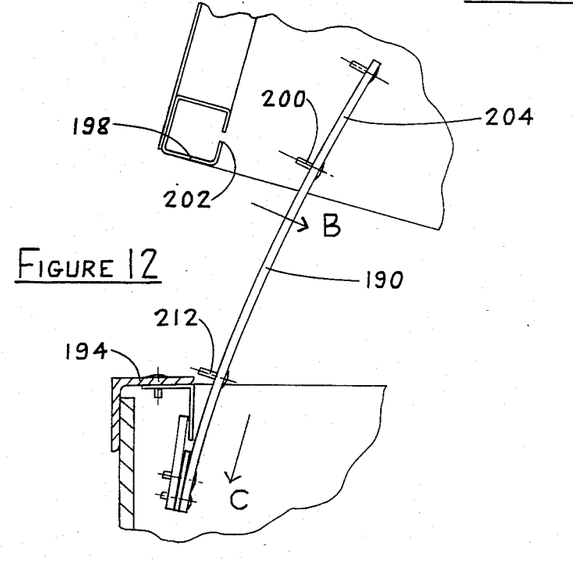
FIG. 12 is a fragmentary sectional view of the removable fixed length bar strut of FIG. 11 as deflected in process of removal.

Referring to FIG. 12; removal of the fixed length strut 190 is effected by forward displacement of said fixed length strut 190 in the direction of arrow B at its upper end 204, causing disengagement of the pin or member 200 from the cover framework hole or mating part 202 to a position clear of the cover structural framework 198 and, simultaneously, causing forward displacement of the lower load pin means 212 to a position clear of the fixed mounting 194 while causing elastic deformation of said fixed length strut 190 so that said fixed length strut 190 may be removed by downward displacement in direction of arrow C.

Referring to FIG. 13; by provision for use of two identical fixed length struts 218 as heretofore described, at left location 220 and at a right location 222, a plurality of fixed, open positions for the cover 16 may be provided between a fully open position allowed by full extension of the left and right compression struts 98,100 and a fully lowered position.

Figure 14:
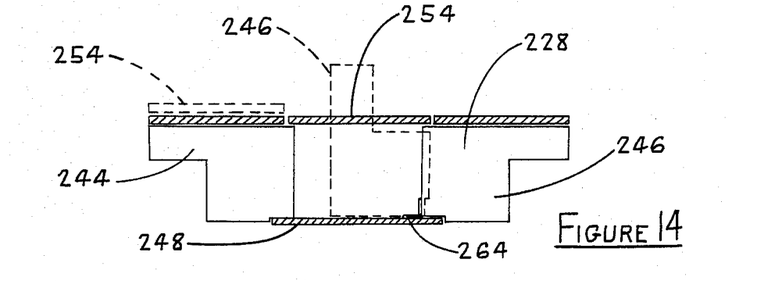
FIG. 14 is a simplified end view of a convertible bed/seat assembly.

FIG. 13 shows also a preferred installation of a camper kit 224 including a removable kitchen unit 226 and a removable convertible bed and seat assembly 228. Said kitchen unit 226 and said bed and seat assembly 228 are typically of a construction form manufactured by Kenroy Enterprises of Elkhart, Ind. The kitchen unit 226 is located forward of the convertible bed and seat assembly 228, being contained between the forward edge 230 of said bed and seat assembly 228 and the load bed forward wall 232. The kitchen unit 226 is in the form of a cabinet 234 having a rearward opening hinged door 236 and typically is equipped with an ice chest 238, a sink 240 and a water supply unit 242. The convertible bed and seat assembly 228 comprises a left lift-top cabinet seat 244, a right lift-top cabinet seat 246, a central floor panel 248, a left cushion 250, a right cushion 252, a central cushion support panel 254 (which is supportedly locatable between said left and right lift-top seats 244,246 so as to form a full width horizontal cushion support surface 256 and is locatable above either left or right said lift-top cabinet seat 244,246 for stowage during seat use), and two central cushions 258. Either said left or right lift-top cabinet seat 244,246 is hingedly attached to the central floor panel 248 so as to allow said lift-top seat 244 or 246 to be lifted at an outside edge 260 and folded inward for the purpose of removal through the tailgate opening 262. FIG. 14 shows an end view of a convertible bed and seat assembly 228 in which the left lift-top cabinet seat 244 is rigidly attached to the central floor panel 248 and right lift-top cabinet seat 246 is hingedly attached to said central floor panel 248 via hinge means 264, being shown in full line in a normal use installed position and in broken line in a folded for removal position. The central cushion support panel 254 is shown in full line as positioned for bed use and in broken line as positioned for seat use.

Figure 15:
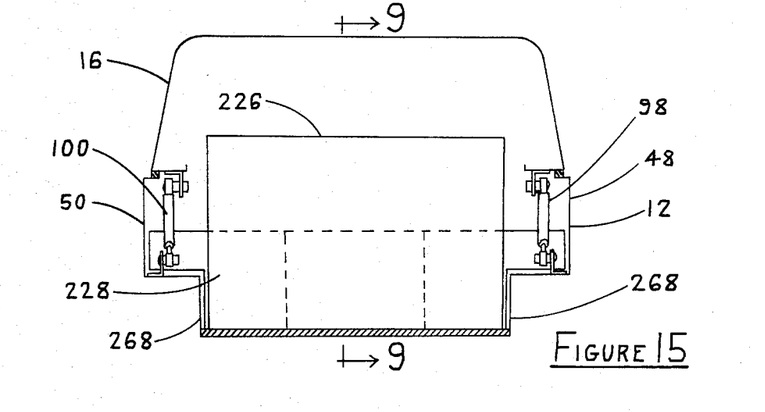
FIG. 15 is a simplified sectional rearward view of a preferred installation of a kitchen unit and convertible bed/seat assembly in a lift-roof trailer.
Figure 16:
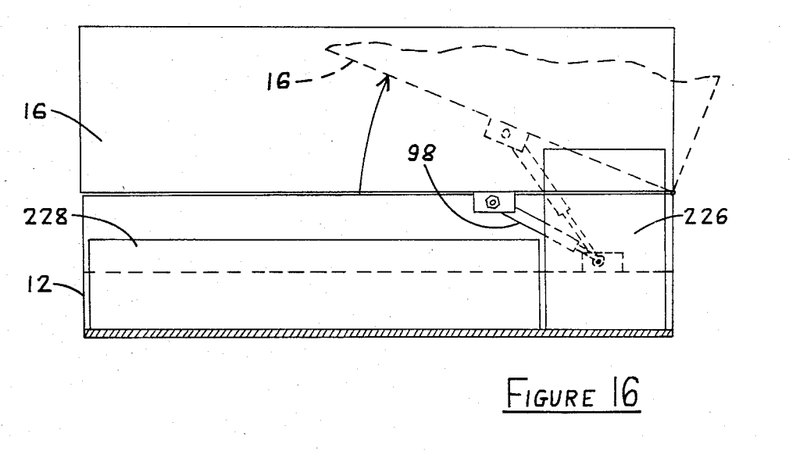
FIG. 16 is a simplified sectional view looking along lines 9—9 of FIG. 15.

Referring to FIG. 15; it can be seen that, with appropriate dimensions, the removable convertible bed and seat assembly 228 may be fittedly located within the full interior width of the load bed 12 and, by use of locating surfaces 266,268 inboard of the load bed outer walls 48,50, the kitchen unit 226 may be fittedly located so as to be restricted from sideways movement relative to said load bed 12 while also allowing clearance for said compression struts 98,100. Referring to FIG. 16; it can also be seen that, with appropriate dimensions, said convertible bed and seat assembly 228 in combination with the kitchen unit 226 may be fittedly installed within the interior length of the load bed 12, while also allowing clearance to the compression struts 98,100 in any operating condition.

Figures 17, 18:
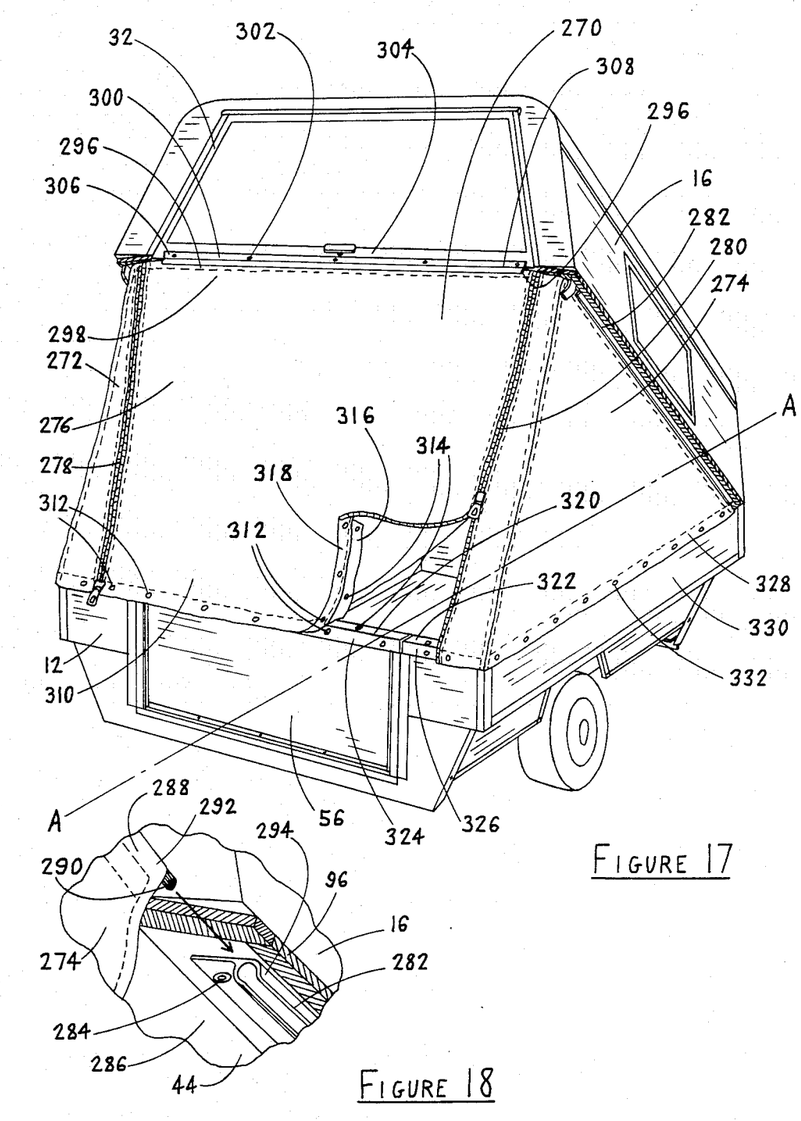
FIG. 17 is a perspective view of a lift-roof trailer having a preferred design of removable flexible panel camping enclosure.
FIG. 18 is a fragmentary view of a preferred method of attachment of a flexible side panel to the cover.

Referring to FIG. 17; for the purpose of weather protection, a full enclosure 270 may be provided with the cover 16 in a raised position by installation of a left flexible panel 272, a right flexible panel 274 and a rear flexible panel 276 between the cover 16 and the load bed 12. Said flexible panels 272, 274, 276 typically are made from a tent fabric cut and sewn to an appropriate form. The rear panel 276 is attachable to the left panel 272 by means of a left zip joint 278 and to the right panel 274 by means of a right zip joint 280.

Referring to FIG. 18; the right flexible panel 274 is removably attached to the cover 16 by means of retaining rail 282, which is attached by suitable fastener means 284 to the lower surface 286 of the right horizontal skirt 44 immediately inboard of the longitudinal seal 96. The upper edge 288 of said right flexible panel 274 is stitched along its length around a rope insert 290, so that said upper edge 288 may be slid at its forward end 292 into engagement with the rearward end 294 of the retaining rail 282, being slid forward in said rail 282 until fully retained along its length. Referring to FIG. 17, the rear flexible panel 276 is in a similar manner removably attached to the rear door/window 32 of the cover 16 by engagement of a hemmed rope insert 296 at the upper edge 298 of said rear panel 276 with a retaining rail 300 attached with suitable fastener means 302 to the lower edge 304 of said rear door/window 32.

Referring again to FIG. 17; the rear flexible panel 276 is installed by sliding the hemmed rope insert 296 at the upper edge 298 of said rear panel 276 into full engagement with the retaining rail 300 from either the left end 306 or the right end 308. The lower edge 310 of the rear panel 276 is attached to the load bed 12 and to the tailgate 56 by quick disconnect fastener means 312,314 and includes both an inside surface 316, allowing access from inside the full enclosure 270 to inside quick disconnect fastener means 314, and an outside surface 318, allowing access from outside said full weather enclosure 270 to outside quick disconnect fastener means 312. Said inside quick disconnect fastener means 314 functions to attach said inside surface 316 to inside surfaces 320,322 of the tailgate 56 and the load bed 12 and said outside quick disconnect fastener means 318 functions to attach the outside surface 312 to outside surfaces 324,326 of said tailgate 56 and/or said load bed 12. Referring still to FIG. 17; the lower edge 328 of the right flexible panel 274 is removably fastened to the outside surface 330 of the load bed 12 by quick disconnect fastener means 332. The left flexible panel 272 is attached to the cover 16 and to the load bed 12 in a manner and with means forming a mirror image with said right panel 274 about a vertical plane drawn through a trailer longitudinal centerline.

The preferred design of lift-roof trailer, besides providing to the user advantages of convenience and energy efficiency, employs readily commercially available component parts and accomodates the use of standard commercial material sizes with a minimal waste in its manufacture. For example, with use of an eight foot pickup truck cover the use of a floor of standard four feet by eight feet panel dimensions is accomodated. Walls 48, 50, 52, 54 may also be made from material of standard panel size with minimal wastage by careful choice of height dimensions, as, for example, twelve or sixteen inches for the walls 48, 50.

There has been described and illustrated what is considered a preferred embodiment of the invention. However, these specifications should not be construed as limitations upon the scope of the invention since it will be understood that many variations may be made by one skilled in the art without departing from the scope of the invention as defined by the appended claims. For examples: various types and positioning of latching means other than the drawlatch arrangement described; to meet certain preferences the panel enclosure may be of a form providing full enclosure without a tailgate in position; use of a cover design which is more aerodynamically efficient in its forward shape.

I claim:

1. A closed trailer comprising:
    a cover having a roof, a left wall, a right wall, a forward wall and a rearward wall, each wall optionally including one or more windows and the rearward wall also including a door pivotally attached about a lateral axis in proximity to the rearward edge of the roof and having latching means lockable from an exterior location; said cover being pivotally attached about a lateral axis in proximity to the lower edge of the forward wall to the forward end of a suitable load bed;
    said suitable load bed having wheels, coupling means, a floor, a left wall, a right wall, a forward wall and a rearward wall, said rearward wall including an opening, and/or removable, tailgate; said tailgate being retained as a closing portion of the rear wall in such a way as to be openable and/or removably only when the cover is raised at its rearward end from a closed position and/or the cover rear door is in an unlatched or open condition;
    said suitable load bed being of such dimensions relative to said cover that, with said cover in a fully lowered position relative to said load bed, opposing perimetral interfaces are formed between the lower edges of the walls and rear door of said cover and the upper edges of the walls and tailgate of said load bed such that insertion of suitable sealing means between said opposing perimetral interfaces shall provide a perimetral weather seal therebetween;
    a left and right latching means between the cover and the load bed, each being located at a rearward position outboard of and on opposite sides of the cover rear door so that, with the tailgate in a fully closed position, said latching means are accessible from an outside location only when the cover is in a raised position relative to the load bed and/or said cover rear door is in an open position.

2. A closed trailer as defined in claim 1, in which the forward wall is sloped and/or suitably blended into the roof and/or left and right side walls so as to provide an aerodynamic improvement.

3. The combination of a closed trailer as defined in claim 1 with a left compression strut and a right compression strut, each pivotally attached at the lower end to the load bed and pivotally attached at the upper end to the cover in such a manner as to provide assist in lifting said cover from a lowered to a raised position relative to the load bed.

4. The combination of a closed trailer as defined in claim 2 with a left compression strut and a right compression strut, each pivotally attached at the lower end to the load bed and pivotally attached at the upper end to the cover in such a manner as to provide assist in lifting said cover from a lowered to a raised position relative to the load bed.

5. The combination of a closed trailer as defined in claim 1 with removable fixed length struts which may be added between the load bed and the cover, providing one or more fixed cover positions above the fully lowered cover position.

6. The combination of a closed trailer as defined in claim 2 with removable fixed length struts which may be added between the load bed and the cover, providing one or more fixed cover positions above the fully lowered cover position.

7. The combination of a closed trailer as defined in claim 3 with removable fixed length struts which may be added between the load bed and the cover, providing one or more fixed cover positions between the fully lowered cover position and that cover position provided by full extension of the left and right compression struts.

8. The combination of a closed trailer as defined in claim 4 with removable fixed length struts which may be added between the load bed and the cover, providing one or more fixed cover positions between the fully lowered cover position and that cover position provided by full extension of the left and and right compression struts.

9. The combination of a closed trailer as defined in claim 3 with the addition of a flexible panel enclosure between the cover and the load bed providing full enclosure with the cover in a raised position.

10. The combination of a closed trailer as defined in claim 4 with the addition of a flexible panel enclosure between the cover and the load bed, providing full enclosure with the cover in a raised position.

11. The combination of a closed trailer as defined in claim 5 with the addition of a flexible panel enclosure between the cover and the load bed, providing full enclosure with the cover in a raised position.

12. The combination of a closed trailer as defined in claim 6 with the addition of a flexible panel enclosure between the cover and the load bed, providing full enclosure with the cover in a raised position.

13. The combination of a closed trailer as defined in claim 7 with the addition of a flexible panel enclosure between the cover and the load bed, providing full enclosure with the cover in a raised position.

14. The combination of a closed trailer as defined in claim 8 with the addition of a flexible panel enclosure between the cover and the load bed, providing full enclosure with the cover in a raised position.

15. The combination of a closed trailer as defined in claim 9 with the addition of a removable fitted camper kit comprising a convertible bed and seat assembly and kitchen unit.

16. The combination of a closed trailer as defined in claim 10 with the addition of a removable fitted camper kit comprising a convertible bed and seat assembly and kitchen unit.

17. The combination of a closed trailer as defined in claim 11 with the addition of a removable fitted camper kit comprising a convertible bed and seat assembly and kitchen unit.

18. The combination of a closed trailer as defined in claim 12 with the addition of a removable fitted camper kit comprising a convertible bed and seat assembly and kitchen unit.

19. The combination of a closed trailer as defined in claim 13 with the addition of a removable fitted camper kit comprising a convertible bed and seat assembly and kitchen unit.

20. The combination of a closed trailer as defined in claim 14 with the addition of a removable fitted camper kit comprising a convertible bed and seat assembly and kitchen unit.

* * * * *